(12) United States Patent
Liu et al.

(10) Patent No.: US 8,730,819 B2
(45) Date of Patent: May 20, 2014

(54) FLEXIBLE NETWORK MEASUREMENT

(75) Inventors: Ying Liu, San Jose, CA (US); Valentina Alaria, San Francisco, CA (US); Pere Monclus, San Jose, CA (US); Sushil Singh, Mountain View, CA (US)

(73) Assignee: Cisco Teechnology, Inc., San Jose, CA (US)

( * ) Notice: Subject to any disclaimer, the term of this patent is extended or adjusted under 35 U.S.C. 154(b) by 625 days.

(21) Appl. No.: 12/904,786

(22) Filed: Oct. 14, 2010

(65) Prior Publication Data

US 2011/0085461 A1 Apr. 14, 2011

Related U.S. Application Data

(60) Provisional application No. 61/251,371, filed on Oct. 14, 2009.

(51) Int. Cl.
G06F 15/173 (2006.01)

(52) U.S. Cl.
USPC .......................................... 370/241; 709/223

(58) Field of Classification Search
USPC ................. 370/235, 241, 252, 328, 338, 469; 709/223–226
See application file for complete search history.

(56) References Cited

U.S. PATENT DOCUMENTS

| | | | | |
|---|---|---|---|---|
| 5,425,076 A * | 6/1995 | Knippelmier | .............. | 379/27.04 |
| 6,745,011 B1 * | 6/2004 | Hendrickson et al. | ..... | 455/67.11 |
| 7,072,305 B1 * | 7/2006 | Gregson | ......................... | 370/241 |
| 7,506,047 B2 * | 3/2009 | Wiles, Jr. | ....................... | 709/224 |
| 7,684,335 B2 * | 3/2010 | Chen | .............................. | 370/236 |
| 7,840,670 B2 * | 11/2010 | Hedayat et al. | ............... | 709/224 |
| 7,860,013 B2 * | 12/2010 | Michel | ........................... | 370/241 |
| 2002/0077786 A1 * | 6/2002 | Vogel et al. | .................... | 702/188 |
| 2002/0120771 A1 * | 8/2002 | Delaney et al. | ............... | 709/238 |
| 2002/0129145 A1 * | 9/2002 | Chow | .............................. | 709/225 |
| 2003/0145077 A1 * | 7/2003 | Khan et al. | ..................... | 709/224 |
| 2003/0179718 A1 * | 9/2003 | Ebata et al. | .................... | 370/255 |
| 2004/0088405 A1 * | 5/2004 | Aggarwal | ...................... | 709/224 |
| 2004/0193709 A1 * | 9/2004 | Selvaggi et al. | .............. | 709/224 |
| 2005/0005004 A1 * | 1/2005 | Sugauchi et al. | ............. | 709/223 |
| 2005/0021748 A1 * | 1/2005 | Garcea et al. | .................. | 709/224 |
| 2005/0044213 A1 * | 2/2005 | Kobayashi et al. | ........... | 709/224 |
| 2005/0228878 A1 * | 10/2005 | Anstey et al. | .................. | 709/224 |
| 2005/0243733 A1 * | 11/2005 | Crawford et al. | ............. | 370/252 |
| 2006/0098594 A1 * | 5/2006 | Ganesh | .......................... | 370/328 |
| 2006/0268718 A1 * | 11/2006 | Jones | ............................ | 370/235 |
| 2007/0058631 A1 * | 3/2007 | Mortier et al. | ................. | 370/392 |

(Continued)

FOREIGN PATENT DOCUMENTS

WO WO 2005/109754 * 11/2005 .............. H04L 12/26

*Primary Examiner* — Habte Mered
*Assistant Examiner* — Prince A Mensah
(74) *Attorney, Agent, or Firm* — Hickman Palermo Truong Becker Bingham Wong LLP

(57) ABSTRACT

A method and a computer-readable storage medium are disclosed for flexible network measurement. Embodiments disclose receiving a network measurement request, transmitting portions of the request to network devices, configuring the network devices to collect metrics from packet data based on the portions of the request, and performing operations to generate metrics as a response to the network measurement request. Embodiments also disclose a flexible, dynamically configurable packet parser. Other embodiments are also disclosed.

24 Claims, 6 Drawing Sheets

(56) References Cited

U.S. PATENT DOCUMENTS

| | | | |
|---|---|---|---|
| 2007/0076634 A1* | 4/2007 | Sumiyoshi et al. | 370/254 |
| 2007/0297349 A1* | 12/2007 | Arkin | 370/255 |
| 2008/0285463 A1* | 11/2008 | Oran | 370/241 |
| 2009/0161566 A1* | 6/2009 | Sridhar et al. | 370/252 |
| 2010/0091676 A1* | 4/2010 | Moran et al. | 370/252 |
| 2010/0182907 A1* | 7/2010 | Pinter et al. | 370/235 |
| 2010/0189044 A1* | 7/2010 | Roy et al. | 370/328 |
| 2010/0246544 A1* | 9/2010 | Brisebois et al. | 370/338 |

* cited by examiner

FLEXIBLE NETWORK MEASUREMENT

CROSS-REFERENCE TO RELATED APPLICATIONS; PRIORITY CLAIM

This application claims the benefit of Provisional Application 61/251,371, filed Oct. 14, 2009, the entire contents of which is hereby incorporated by reference as if fully set forth herein, under 35 U.S.C. §119(e). The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure generally relates to network management.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network administrators use a variety of tools to monitor networks. Current tools expose network administrators to many different interfaces, data formats, processes and levels of granularity for monitoring network resources and traffic. Thus, network administrators are required to learn how to use many different tools to perform network monitoring tasks and to collect needed metrics.

Moreover, current network monitoring tools are pre-configured to support only a limited number of predefined metrics. Thus, if a network administrator needs to monitor network information or collect network metrics that are different than the predefined metrics supported by a particular network monitoring tool, the network administrator must find another tool to collect the needed metrics or request an update from the network monitoring tool vendor.

DETAILED DESCRIPTION

Figure 1:
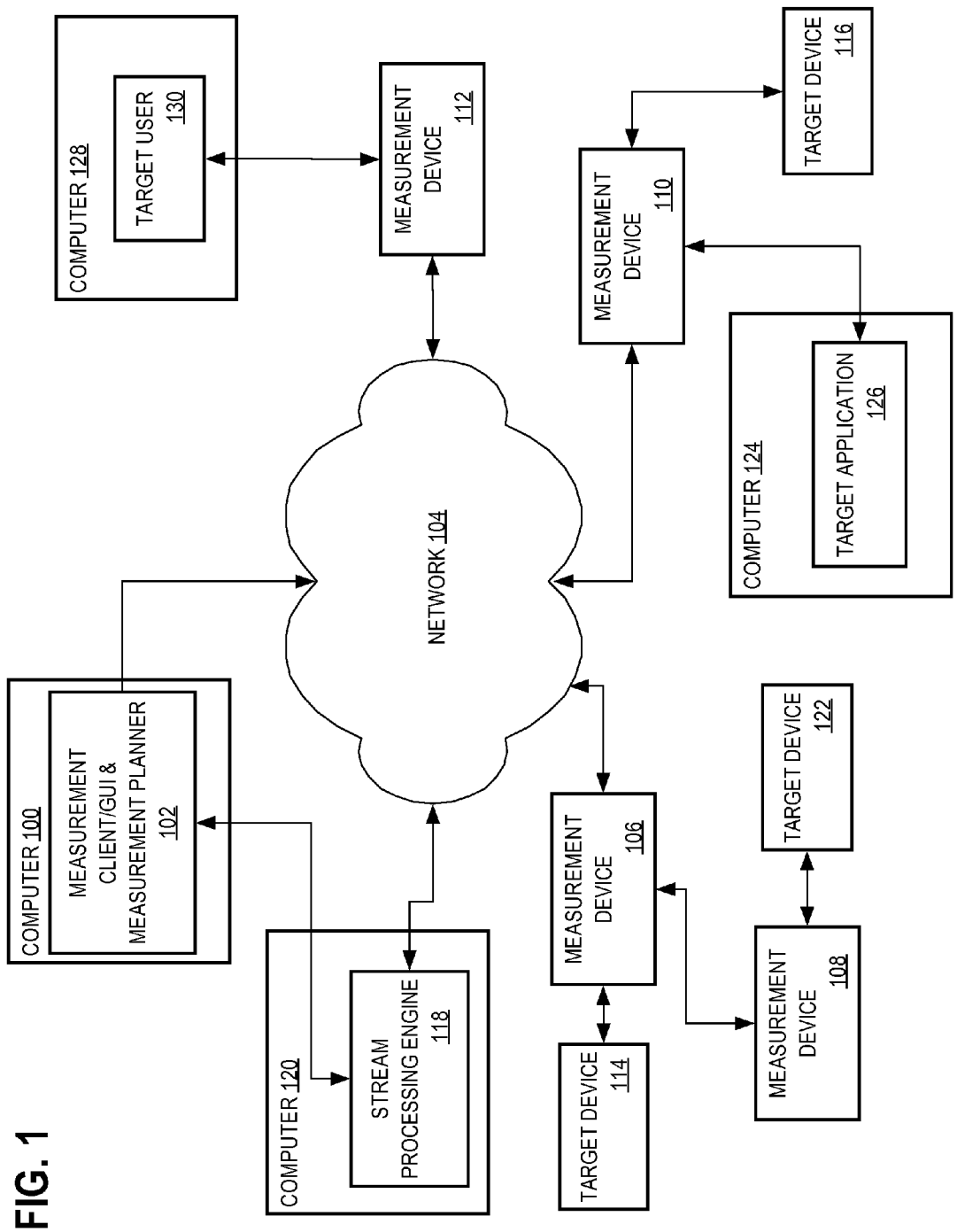
FIG. 1 illustrates a system for flexible network measurement, according to embodiments.

Flexible network measurement is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
3.0 Flexible Network Measurement
   3.1 Measurement Query Planning and Distribution
   3.2 Packet Data Stream Generation
   3.3 Packet Data Stream Processing
   3.4 Example Query—Elephant Flow
4.0 Implementation Mechanisms—Hardware Overview
5.0 Extensions and Alternatives
1.0 General Overview In an embodiment, flexible network measurement is described. In an embodiment, a computer may receive a network measurement request defining a plurality of metrics to collect based on network packet traffic. A first portion of the network measurement request may be transmitted from the computer to one or more network devices. Based on the first portion of the network measurement request, the one or more network devices may be configured to collect a plurality of first metrics based on packets received at the network devices. The one or more network devices may be configured to generate one or more packet data streams that contain the collected first metrics. A second portion of the network measurement request may be transmitted from the computer to a stream processing engine. Based on the second portion of the network measurement request, the stream processing engine may be configured to collect a plurality of second metrics from the one or more packet data streams. The computer may receive from the stream processing engine the plurality of second metrics. The plurality of second metrics may correspond to the plurality of requested metrics according to embodiments.

In some embodiments, a network measurement request may be a relational algebra expression. In an embodiment, causing a network packet parser to be dynamically configured to collect network data from packets based on the first portion of the network measurement request may be performed. In an embodiment, causing the one or more network devices to be dynamically configured to perform one or more operations in response to receiving a network packet and based on the first portion of the network measurement request may be performed. In some embodiments, the one or more operations may include incrementing a counter, averaging packet field values, comparing packet field values, summing packet field values, grouping packet data, hashing packet data, or a combination thereof.

In some embodiments, the network measurement request may be a streaming structured query language statement, an extensible markup language document, or language-integrated query statement. In an embodiment, selecting the one or more network devices from a plurality of network devices based on a proximity of the one or more network devices to a target network device identified in the first portion of the network measurement request may be performed. In some embodiments, the second portion of the network measurement request may define one or more operations to perform on the one or more packet data streams, wherein the one or more operations include a filtering operation, a projection operation, a join operation, or a combination thereof.

In an embodiment, a computer may receive a first portion of a network measurement request defining a plurality of requested metrics to generate based on network packet traffic. In some embodiments, one or more packet data streams generated by one or more network devices based on a plurality of packets received at the one or more network devices may be received at the computer. According to embodiments, based on a second portion of the network measurement request, the computer may generate a plurality of first metrics based on the one or more packet data streams. In an embodiment, the first metrics may correspond to the plurality of requested metrics defined by the first portion of the network measurement request. According to embodiments, the computer may transmit the plurality of first metrics to the first device as a response to the network measurement request.

In some embodiments, the network measurement request may comprise a stream query and the first portion of the network measurement request may comprise a first sub-query derived from the stream query that causes the computer to perform one or more operations on data from at least two of the one or more packet data streams. In an embodiment, the one or more operations may include a selection operation, a filtering operation, a projection operation, a join operation, or a combination thereof. In an embodiment, the second portion of the network measurement request may comprise a second sub-query derived from the stream query that defines packet stream data to generate based on the plurality of packets received at the one or more network devices.

In an embodiment, a network device may receive from a first device a first portion of a network measurement request defining a plurality of requested metrics to generate based on network packet traffic. According to embodiments, a plurality of network packets may be received at the network device, the network device may generate a plurality of first metrics based on one or more of the plurality of packets and the first portion of the network measurement request, and the network device may transmit the plurality of first metrics to a stream processing engine in one or more packet data streams. In an embodiment, the stream processing engine may be configured to generate a plurality of second metrics based on a second portion of the network measurement request and the one or more packet data streams. In some embodiments the stream processing engine may be configured to transmit the plurality of second metrics to the first device.

In some embodiments, the network measurement request may comprise a stream query and the first portion may comprise a sub-query derived from the stream query. In an embodiment, the method may include, upon receiving each of the plurality of network packets, performing one or more operations defined by the sub-query on each network packet to generate at least one of the one or more packet data streams.

In other embodiments, the invention encompasses a computer apparatus and a computer-readable medium configured to carry out the foregoing steps.

2.0 Structural and Functional Overview

Network administrators often need to collect measurements ("metrics") about a network in order to properly manage the network and the devices connected thereto. For example, a network administrator may need to determine the health of a server connected to the network. To do so, the network administrator may need to collect metrics from the network packets transmitted to and from the server through the network. One such metric may be a measurement of throughput at the server. If the throughput metric indicates that the server is processing data or responding to requests at a slower than nominal rate, the network administrator may determine that there is a problem with the server.

To collect metrics about the network, or with respect to a network resource, a network administrator may use a variety of measurement tools. However, currently available tools lack flexibility with respect to the types of measurements that the tools will collect. Network measurement tools only support a limited number of metrics. If network measurement tool vendors receive new measurement requests from users, it may take a year or more for the vendor to add support for the new metrics. Thus, if a tool does not already exist that collects throughput metrics for the server in the example above, the network administrator will either not be able to collect the throughput metric or will have to wait for a vendor to create a tool to collect the desired throughput metric.

Ideally, a network administrator or a network application developer would be able to easily collect network metrics through a flexible and extensible system for network measurement. Embodiments disclosed herein apply a relational data model to solve network measurement tasks to support flexible network measurements without pre-defining all of the metrics to collect. For example, a network administrator may query the network in a manner similar to a relational database to collect network metrics. Received packet data and packet data streams may be treated as if they were traditional database tables and may be queried using an SQL-like declarative language. The query may be executed dynamically against network packets as they are received by data collectors rather than against a conventional database to collect the requested metrics. The SQL-like language enables network administrators ("users") to define streams and to specify their measurement query on one or several streams. With the fixed number of operations in relational algebra, a network administrator can express most network management tasks.

In an embodiment, a declarative language may be leveraged to express network measurement requests. For example, a structured query language, language-integrated query statement, or other SQL-like language may be leveraged to express network measurement requests. With the SQL-like declarative language, a user can define new or personalized measurement requests. Moreover, an SQL-like language may be combined with netPDL or Service Modeling Language (SML) to express the relational algebra of a measurement query. For example, the combination of the SQL-like declarative language and netPDL may provide a mechanism for defining packet field data to collect, operations to perform, a period of time over which data may be collected, and other parameters required for network metric collection activities.

In some embodiments, network packet parsers may be dynamically configured to collect specific network data based on a network measurement request. Thus, approaches disclosed herein take a holistic approach to network measurement such that a single network measurement request defines both data to be collected from network packets and processing to be done on the collected data to generate the requested metrics.

3.0 Flexible Network Measurement

FIG. 1 illustrates a system for flexible network measurement, according to an embodiment. For example, the system may include a measurement client 102, one or more measurement devices 106, 108, 110 and 112, and stream processing engine 118. The measurement devices may be configured to collect metrics from packets transmitted to and from various target devices, users and applications in the network and transmit the metrics in packet data streams to the stream processing engine.

In an embodiment, computer 100 hosts measurement client 102. For example, measurement client 102 may be a network management application that provides an interface that allows a network administrator to submit network measurement requests. Measurement client 102 may be used by a network administrator, or other user, to configure and monitor network 104 and the network resources and devices coupled to network 104. Thus, measurement client 104 may store, or be able to access, data relating to the topology of network 104 and the various network resources and devices connected to the network.

In an embodiment, network 104 may be coupled to, or include, measurement devices 106, 108, 110 and 112. For example, a measurement device may be a router, switch, bridge or other network device that are capable of processing packets transmitted through network 104. In various embodiments, measurement devices may receive portions of a network measurement request from a measurement client and based on the received portions be configured to collect metrics based on received packet data. For example, measurement devices 106, 108, 110 or 112 may receive portions of a network measurement request from measurement client 102. The measurement devices may interpret the received portions of the network measurement request and, in response to interpreting the portions, be dynamically configured to collect the metrics specified in the received portions. In various embodiments, the measurement devices may generate packet data streams containing the collected metrics and transmit the packet data streams to a stream processing engine, as disclosed in further detail below.

According to embodiments, a measurement device may be selected for network metric collection based on the measurement device's proximity to a measurement target. For example, if a network administrator requests metrics pertaining to target device 114, measurement device 106 may be configured to collect the specified metrics from the packet data transmitted through measurement device 106. Similarly, if measurements pertaining to target device 122 were needed, measurement device 108 may be configured to collect the needed metrics. Moreover, if the network administrator wanted to collect metrics corresponding to target user 130 on computer 128, measurement device 112 may be configured to collect the target user metrics. Furthermore, if a network administrator needs to collect metrics pertaining to target application 126 on computer 124 or pertaining to target device 116, measurement device 110 may be configured to collect those metrics. In some embodiments, more than one measurement target may be specified by a request. For example, a network administrator may need to collect metrics regarding communications between target user 130 and target device 114. Thus, measurement device 112 and measurement device 106 may be configured to collect metrics for target user 130 and target device 114, respectively.

In an embodiment, a stream processing engine is communicatively coupled to a measurement client and one or more measurement devices. For example, stream processing engine 118 may be a process hosted on computer 120. Alternatively, stream processing engine may be hosted on computer 100 along with measurement client 102, or on any other network device having appropriate processing or computing power, such as measurement device 106. In some embodiments, stream processing engine 118 may receive a portion of a network measurement request from measurement client 102 defining metrics to collect from packet data streams received from measurement devices in the network. For example, stream processing engine 118 may receive packet data streams from measurement devices 106, 108, 110 or 112. In various embodiments, upon interpreting a received portion of the network measurement request from the measurement client, the stream processing engine may be dynamically configured to collect the metrics specified in the portion of the network measurement request based on data received in packet data streams and transmit the collected metrics to the measurement client, as disclosed in further detail below.

3.1 Measurement Query Planning and Distribution

Figure 2:
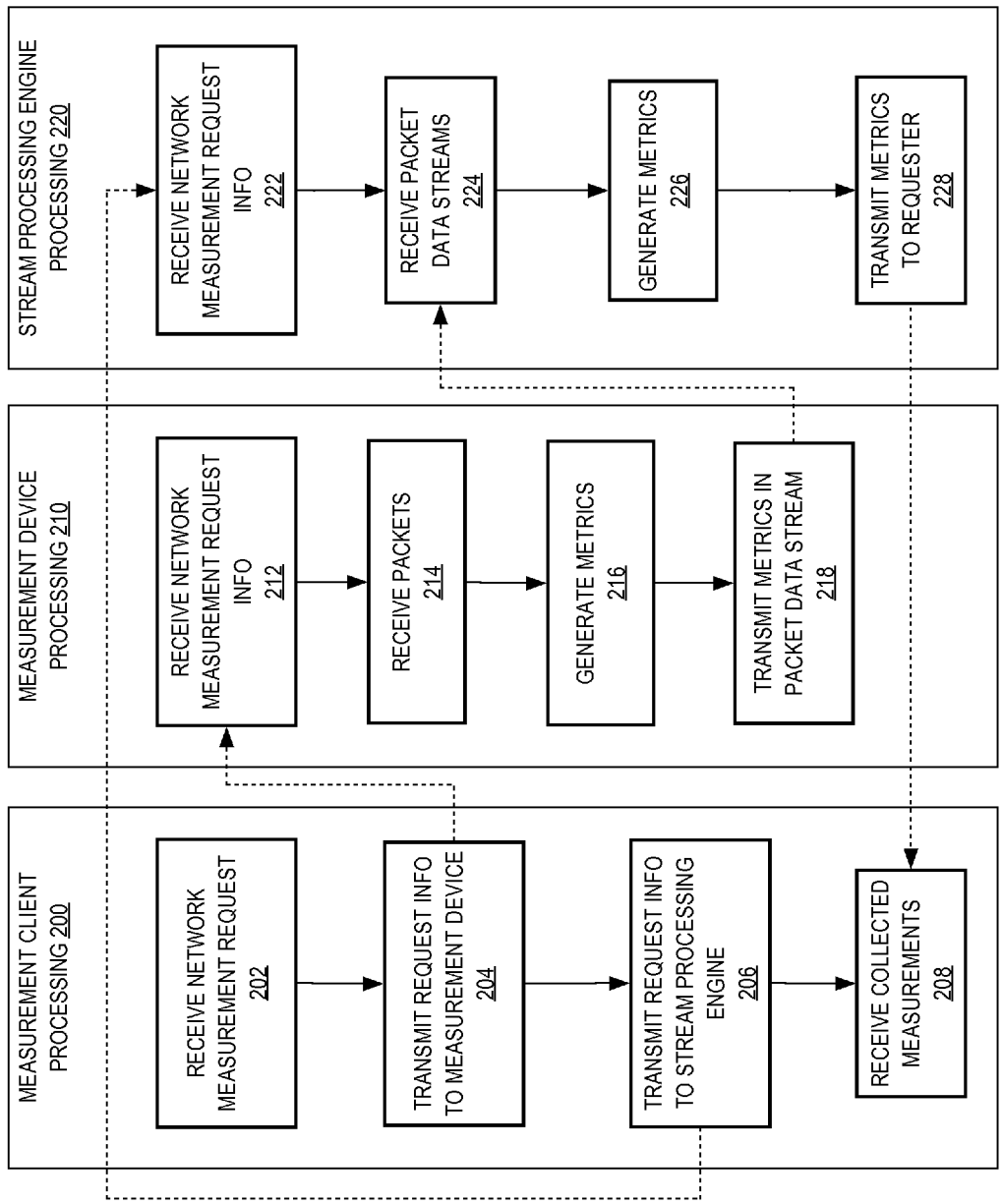
FIG. 2 illustrates a method for flexible network measurement according to an embodiment.

FIG. 2 illustrates a method for flexible network measurement according to an embodiment. At step 200, measurement client processing is performed, according to embodiments. For example, a measurement client may receive a network measurement request, transmit request information to one or more measurement devices, transmit request information to a stream processing engine and receive measurements collected by the measurement devices and the stream processing engine.

At step 202, a network measurement request is received at a measurement client, according to embodiments. For example, a network administrator may submit a network measurement request to the measurement client. The network measurement request may define a plurality of requested metrics to collect based on network packet traffic received at measurement devices and the measurement client may parse the network measurement request to determine metrics to be collected. According to embodiments, the network measurement request may be a relational algebra expression. In some embodiments, the network measurement request may be formatted using an SQL-like language, such as StreamSQL, CQL or SCSQL. The network measurement request may be encoded as an extensible markup language (XML) document, according to embodiments.

In some embodiments, the measurement client may determine a plan for collecting the metrics identified in the measurement request. Determining a metric collection plan may include identifying measurement targets, identifying network devices that are best suited for metric collection based on the proximity of the network devices to the measurement targets and identifying particular portions of the measurement request to distribute to particular devices. In some embodiments, the measurement request may identify a plurality of measurement targets. Thus, the measurement client may split the measurement request into portions to generate separate queries particular to each measurement target and distribute the portions to metric collection devices associated with the measurement targets.

At step 204, measurement request information is transmitted to one or more measurement devices from the measurement client, according to embodiments. For example, the measurement client may determine based on the measurement request that metrics are to be collected for two measurement targets: target A and target B. The measurement client may break up the measurement request into three portions: a first portion defining the measurement query for target A, a second portion defining the measurement query for target B, and a third portion defining a measurement query used to aggregate the metrics collected for target A and target B. The measurement client may then transmit the first portion to a measurement device associated with target A and transmit the second portion to a measurement device associated with target B. Thus, a portion of the network measurement request corresponding to a particular measurement target may be transmitted from a computer to one or more network devices and, based on the first portion of the network measurement request, the one or more network devices may be configured to collect a plurality of metrics based on packets received at the network devices and to generate one or more packet data streams that contain the collected first metrics.

At step 206, measurement request information is transmitted to a stream processing engine from the measurement client, according to embodiments. For example, the measurement client may transmit the third portion of the measurement request to a stream processing engine. The stream processing engine may parse the third portion of the measurement request to determine metrics to collect based on data associated with target A and target B. For example, the measurement devices associated with target A and target B may collect metrics for targets A and B based on the first portion and the second portion of the measurement request and generate packet data streams based on the collected metrics. The packet data streams may be transmitted to the stream processing engine and the stream processing engine may collect metrics or perform operations on the packet data streams containing the metrics for target A and target B based on the third portion of the network measurement request. Thus, in an embodiment, a portion of the network measurement request corresponding to queries to be performed on multiple packet data streams may be transmitted from a computer to a stream processing engine and based on the portion of the network measurement request the stream processing engine may be configured to collect a plurality of metrics from the one or more packet data streams.

At step 208, measurements collected by the one or more measurement devices and the stream processing engine are received at the measurement client, according to embodiments. For example, the stream processing engine may process the packet data streams to generate the metrics requested in the network measurement request submitted by the network administrator. The metrics may be generated by performing operations on the data in the packet data streams that contain the metrics collected for target A and target B. The operations performed by the stream processing engine may aggregate the metrics associated with targets A and B to generate a response to the network measurement request submitted by the network administrator. Once the stream processing engine processes the packet data streams according to information received in the third portion of the network measurement request, the stream processing engine may transmit the metric generated at the stream processing engine to the measurement client as a response to the network measurement request. Thus, in an embodiment, a computer may receive from the stream processing engine a plurality of metrics that correspond to the plurality of requested metrics.

Figure 3:
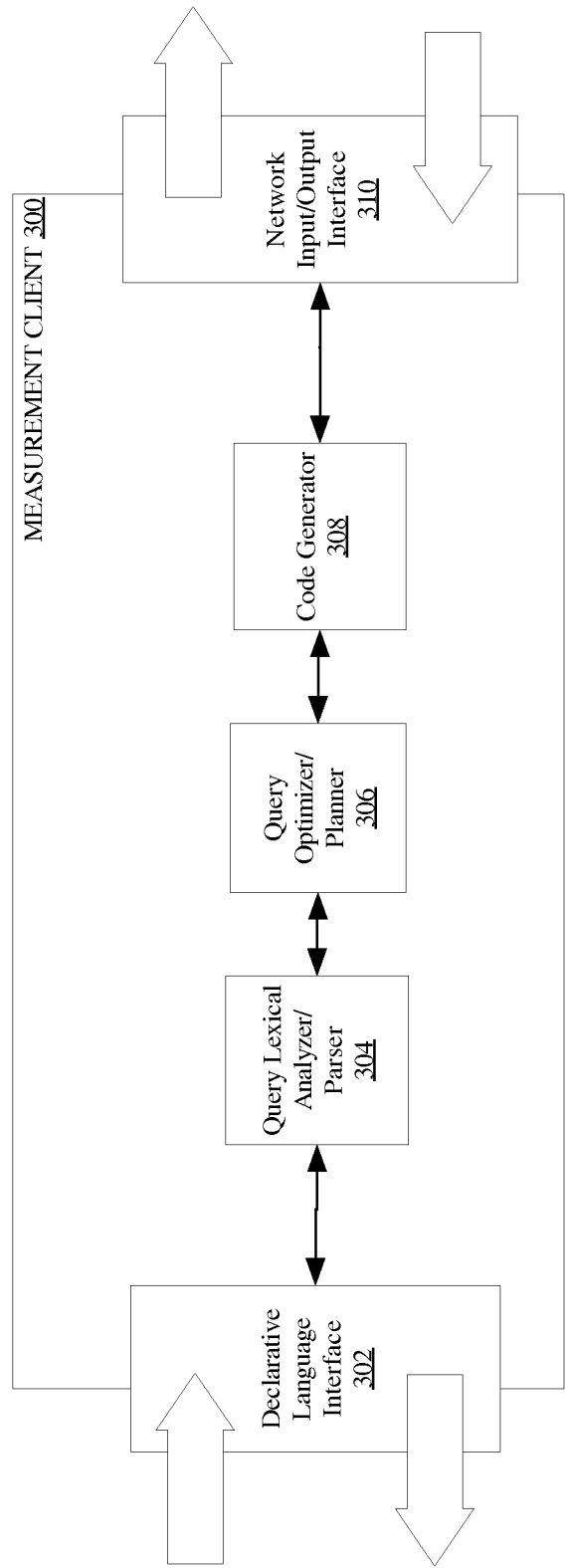
FIG. 3 illustrates a flexible network measurement client according to embodiments.

FIG. 3 illustrates a flexible network measurement client according to embodiments. In some embodiments, measurement client 300 of FIG. 3 may perform steps 200-208 of FIG. 2, disclosed above. Measurement client 300 may include declarative language interface 302, query lexical analyzer/parser 304, query optimizer/planner 306, code generator 308, and network input/output interface 310, according to embodiments.

Declarative language interface 302 may receive network measurement requests, according to embodiments. For example, measurement client 300 may receive a network measurement request from a network administrator. The network measurement request may be submitted by the network administrator through declarative language interface 302 using a declarative language, such as StreamSQL, CQL, or any other SQL-like declarative language. The SQL-like declarative language of the network measurement request may be combined with netPDL or Service Modeling Language (SML) to express the relational algebra of a measurement query.

Query lexical analyzer/parser 304 may parse network measurement requests and output a parse tree, according to embodiments. According to embodiments, the network measurement request may be parsed by parser 304 to determine the parameters of the network measurement request. For example, the network measurement request may specify targets for metric collection and identify packet field data to collect from packets transmitted to or from the-specified targets. The network measurement request may also identify operations to perform when packets are received, such as incrementing counters, averaging packet field values, determining minimum packet field values, determining maximum packet field values, determining median packet field values, or any other operation that might generate metrics useful to the network administrator.

Query optimizer/planner 306 may determine a metric collection plan based on a network measurement request, according to embodiments. In an embodiment, planner 306 may analyze the information parsed from the network measurement request and determine a metric collection plan. For example, planner 306 may analyze the network measurement request data to identify one or more measurement targets. Based on the identified measurement targets and network topology data available to, or stored at, the measurement client, the planner 306 may identify one or more measurement devices for processing the network measurement request and identify portions of the network measurement request to transmit to the one or more measurement devices. According to embodiments, measurement devices may be any device, such as a router, switch, bridge, or any other network device, that receives network packets and that is capable of being configured to collect metrics based on the received packets. In an embodiment, query optimizer/planner 306 may also identify portions of the network measurement request to send to the stream processing engine so that the stream processing engine may be configured to collect metrics based on packet data streams associated with various measurement targets.

Code generator 308 may compile the network measurement request to generate measurement queries having an internal representation, according to embodiments. For example, the network measurement request submitted by a network administrator may be formatted as a human readable SQL or SQL-like query. The human readable query may be interpreted and compiled by the code generator 308 to generate queries having an internal representation that may be more efficient for a computing device to store and process. In an embodiment, the code generator 308 may compile a plurality of queries for each measurement request. For example, each of the queries may correspond to a portion of the network measurement request submitted by the network administrator. Each of the queries may correspond to a particular target of the network measurement request. Thus, for each portion of the query, the internal query representation is based on the destinations for the query. For example, a representation that is sent to the stream processing engine may be different from a representation that is sent to a measurement device. A representation that is sent to a measurement device may comprise one or more configuration commands for the network device acting as the measurement device.

Network input/output interface 310 may transmit portions of the network measurement request to measurement devices and stream processing engines, according to embodiments. For example, once the network measurement request has been received by declarative language interface 302, the network measurement request has been parsed by query lexical analyzer/parser 304, metric collection has been planned by query optimizer/planner 306, and queries have been compiled by code generator 308, the compiled queries corresponding to portions of the network measurement request may be transmitted to measurement devices and stream processing engines via network input/output interface 310.

3.2 Packet Data Stream Generation

At step 210 of FIG. 2, measurement device processing is performed, according to embodiments. For example, a measurement device may receive network measurement request information, receive network packets, generate one or more metrics based on received packet data, and transmit metrics in one or more packet data streams to a stream processing engine. At step 212, network measurement request information is received at a measurement device, according to embodiments. In an embodiment, the network measurement request may include a stream query. For example, a portion of a network measurement request defining a plurality of requested metrics to generate based on network packet traffic may be received at a measurement device.

In an embodiment, a network measurement request portion may include a sub-query derived from the stream query that defines metrics to collect for a particular measurement target. According to embodiments, upon receiving each of a plurality of network packets, the measurement device may perform one or more operations defined by the sub-query on each network packet to generate at least one of the one or more packet data streams. In an embodiment, the portion may define one or more metrics to collect for a particular target. For example, a network administrator may wish to collect metrics associated with a server on a network. The network administrator may submit a network measurement request to a measurement client. The measurement client may transmit a portion of the network measurement request pertaining to the server to a measurement device, for example a router, coupled to the server. The router may be configured, based on the portion of the network measurement request, to collect metrics based on packet data transmitted to and from the server.

At step 214, network packets are received at the measurement device, according to embodiments. For example, the measurement device may be a switch or a router on the network configured to collect, or generate, metrics based on packet data received at the switch. The measurement device may receive packets transmitted on the network and forward the packets to a measurement target. The measurement device may also receive packets transmitted from a measurement target and forward the packets to devices on the network.

At step 216, metrics are generated based on the received packets at the measurement device, according to embodiments. In an embodiment, when packet data is received, the measurement device may parse the packet data to collect data from packet fields and generate metrics based on the packet field data. In an embodiment, the measurement device may generate a plurality of first metrics based on one or more of the plurality of packets and based on a portion of the network measurement request received at step 212.

In some embodiments, the measurement device may generate metrics based on packets received at the measurement device by performing operations in response to receiving a packet. For example, the measurement device may increment a counter when packets that match the criteria specified in a network measurement request are received. In some embodiments, the measurement device may generate metrics by performing operations on packet field data when packets are received. For example, the measurement device may average packet field data, store the maximum, minimum or median value for a specific packet field, or perform a summation operation on packet field data received. The measurement device may determine the total size for a packet flow by summing packet size data, for example.

At step 218, the generated metrics are transmitted from the measurement device to a stream processing engine in one or more packet data streams, according to embodiments. For example, the measurement device may generate one or more packet data streams containing the metrics collected or generated at step 216. In an embodiment, the generated packet data streams may be transmitted to a stream processing engine so that the stream processing engine may further process the packet data streams according to criteria specified in a network measurement request. According to embodiments, the measurement device may transmit the metrics to a stream processing engine in one or more packet data streams. The stream processing engine may configured to generate a plurality of metrics based on a portion of the network measurement request and the one or more packet data streams and may be configured to transmit the plurality of first metrics to the first device, according to embodiments.

Figure 4:
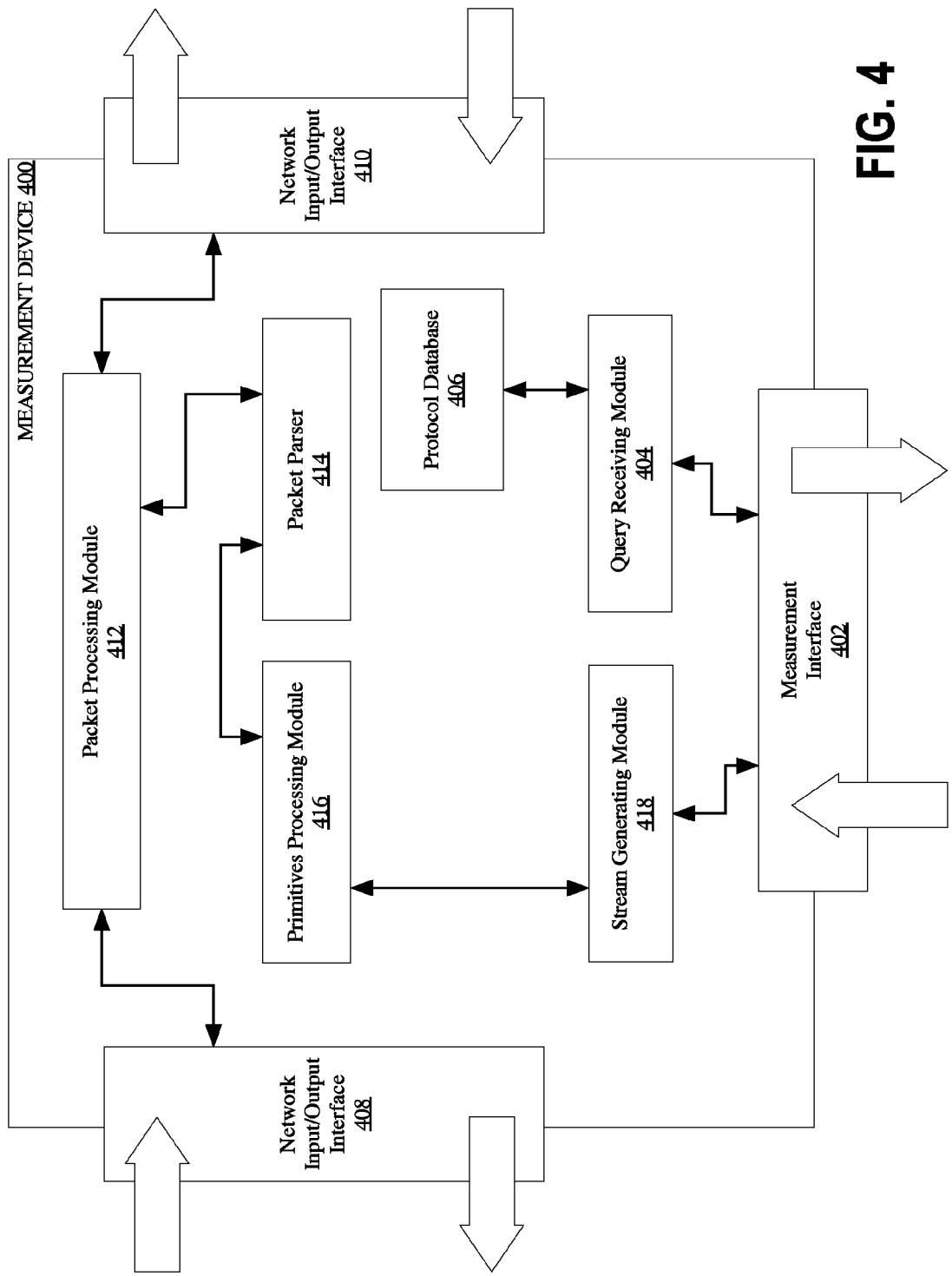
FIG. 4 illustrates a flexible network measurement device, according to embodiments.

FIG. 4 illustrates a flexible network measurement device, according to embodiments. In some embodiments, measurement device 400 of FIG. 4 may perform steps 210-218 of FIG. 2, disclosed above. In some embodiments, measurement device 400 may provide a first layer of packet data collection and processing to generate one or more metrics defined by a network measurement request received at a measurement client. Measurement device 400 may include measurement interface 402, query receiving module 404, protocol database 406, packet processing module 412, packet parser 414, primitives processing module 416, stream generating module 418, and processor(s) 420, according to embodiments.

Measurement interface 402 receives network measurement request information, according to embodiments. For example, measurement client 300 may transmit portions of a network measurement request to measurement device 400 via measurement interface 402. The network measurement request portion may define one or more metrics to collect from packet data received at measurement device 400. In some embodiments, the network measurement request portion may be a compiled query represented by an internal format. In an embodiment, the network measurement request portion may be formatted as an SQL-like query statement.

Query receiving module 404 receives network measurement request portions and parses the portions to identify query parameters, according to embodiments. For example, measurement interface 402 may transmit a received network measurement portion, or query, to the query receiving module. The query receiving module may parse the query to identify the criteria for collecting network metrics. For example, the query receiving module may parse the query to determine the measurement target to determine packet fields to collect and to identify operations to perform to generate the metrics requested in the network measurement request portion. The query may identify fields that may be used to identify packets subject to measurement operations or data collection. In an embodiment, query receiving module 404 may store the query parameters. In some embodiments, query receiving module 404 may transmit the query parameters to packet parser 414 and primitives processing module 416 so that the parser and the module may be configured for metric collection.

Protocol database 406 describes the collected packet stream on the measurement device and is referenced when the packet parser and primitives processing module are configured.

Data storage may be provided for storing queries received from query receiving module 404, according to embodiments. For example, if measurement device 400 is coupled to a plurality of measurement targets, measurement device 400 may receive a plurality of network measurement request portions. Each portion, or query, may define one or more metrics to collect for some, or all, of the measurement targets coupled to the measurement device. In some embodiments, the queries received at measurement device 400 are stored for reference at some future time. These stored queries may be used to configure packet parser 414 and/or primitives processing module 416.

Packet processing module 412 processes packets received at measurement device 400, according to embodiments. For example, if measurement device 400 is a router or a switch device, packet processing module may perform packet routing or switching operations according to the function of the device. Thus, according to embodiments, packet processing module may receive packets from network input/output interface 408, perform internal routing operations and then transmit the packets out onto the network via network input/output interface 410. According to some embodiments, packet processing module may receive packets from network input/output interface 410, perform internal routing operations and then transmit the packets out onto the network via network input/output interface 408. Packet processing module 412 may perform packet switching operations in a manner similar to the packet routing operations described above.

Packet parser 414 is a dynamically configurable parser that parses packet data, according to embodiments. For example, packet parser 414 may receive network measurement request information that defines criteria for collecting packet field data. The criteria may identify key packet field values for determining which packets to collect data from. The criteria may identify packet fields from which to collect packet data. Based on the criteria defined by the network request information, or compiled query information, packet parser 414 may be dynamically configured to collect the specified packet fields.

Primitives processing module 416 is dynamically configured to perform primitive operations on collected packet data, according to embodiments. For example, primitives processing module 416 may be dynamically configured based on network measurement request information, or compiled query information, received at measurement device 400. According to embodiments, the network request information may define one or more operations to perform on packet data collected by packet parser 414. For example, primitives processing module 416 may be configured to perform selection, projection and aggregation operations on packet data received from packet parser 414.

Stream generating module 418 generates one or more packet data streams based on the packet data collected by packet parser 414 and processed by primitives processing module 416, according to embodiments. In an embodiment, stream generating module 418 transmits the one or more packet data streams to a stream processing engine via measurement interface 402.

3.3 Packet Data Stream Processing

At step 220, stream processing engine processing is performed, according to embodiments. For example, a stream processing engine may receive network measurement request information, receive one or more packet data streams, generate one or more metrics based on the data in the packet data streams and transmit the generated metrics to the requesting measurement client.

At step 222, network measurement request information is received at a stream processing engine, according to embodiments. For example, a measurement client may transmit a portion of a network measurement request defining a plurality of requested metrics to generate based on network packet traffic to the stream processing engine. The portion may define operations to perform on packet data to be received in one or more packet data streams. In an embodiment, the network measurement information may define selection, projection, aggregation and correlation operations to perform on packet data received in different packet data streams. Based on the information in the network measurement request data, the stream processing engine may be dynamically configured to process packet data received in one or more packet data streams.

At step 224, one or more packet data streams are received at the stream processing engine, according to embodiments. For example, one or more packet data streams may be generated by one or more measurement devices on the network. The packet data streams may be generated based on network measurement information transmitted to the measurement devices from a measurement client. The packet data streams may contain a plurality of metrics generated, or collected, at the measurement devices based on packets received at the measurement devices.

At step 226, one or more metrics are generated by the stream processing engine, according to embodiments. For example, the stream processing engine may query one or more packet data streams and perform selection, projection, aggregation and/or correlation operations on the packet data streams to generate one or more metrics. The stream processing engine may be dynamically configured to perform the operations in response to receiving network measurement information that defines the metrics to collect and the operations to perform on the data in the one or more packet data streams to generate the metrics requested in the network measurement request. Thus, the stream processing engine may generate a plurality of metrics based on the packet data streams and based on a portion of the network measurement request received by the measurement client, according to embodiments. In some embodiments, the plurality of metrics generated may correspond to the metrics defined by a portion of the network measurement request information.

At step 228, the one or more metrics are transmitted to the measurement client, according to embodiments. For example, once the stream processing engine generates the requested metrics, the stream processing engine may transmit the metrics to the measurement client as a response to the network measurement request submitted to the measurement client by the network administrator.

Figure 5:
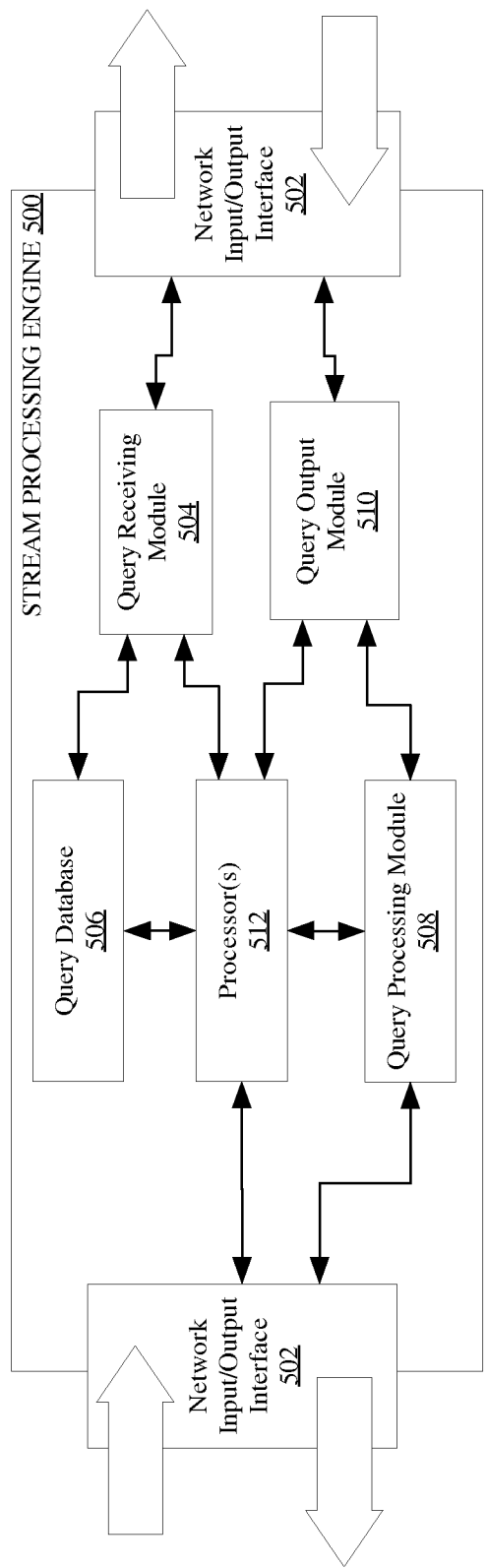
FIG. 5 illustrates a flexible network measurement stream processing engine according to embodiments.

FIG. 5 illustrates a flexible network measurement stream processing engine according to embodiments. In some embodiments, stream processing engine 500 of FIG. 5 may perform steps 220-228 of FIG. 2, disclosed above. In some embodiments, stream processing engine 500 may provide a second layer of packet data collection and processing to generate one or more metrics defined by a network measurement request received at a measurement client. Stream processing engine 500 may include network input/output interface 502, query receiving module 504, query database 506, query processing module 508, query output module 510, and processor(s) 512, according to embodiments.

Network input/output interface 502 receives network measurement request information from measurement clients and packet data streams from measurement devices, according to embodiments. In some embodiments, network input/output interface 502 transmits metrics collected from packet data streams to a measurement client as a response to the network measurement request.

Query receiving module 504 receives queries, or network measurement request information, from a measurement client via network input/output interface 502, according to embodiments. In some embodiments, query receiving module may interpret the received query and configure query processing module 508 to execute the query on incoming packet data streams. In an embodiment, query receiving module may store received queries in query database 506 for future reference.

Query database 506 stores query information received from measurement clients, according to embodiments. For example, a measurement client may transmit a plurality of measurement request information defining a plurality of stream queries. The stream queries may be stored in query database 506. Query processing module 508 may access query database 506 for query definition information used to configure the query processing module for metric collection and generation.

Query processing module 508 receives one or more packet data streams via network interface 502 and processes the data in the packet data streams according to stream query information received from the measurement client, according to embodiments. For example, query processing module 508 may be configured to query packet data streams based on network measurement request information received from the measurement client. The network measurement request information may define a stream query that includes one or more operations to perform on packet stream data.

In an embodiment, the operations that the query processing module is configured to perform may include selection, projection, aggregation and/or correlation operations on the packet data streams to generate one or more metrics requested in the network measurement request. For example, query processing module 508 may perform an operation specified by the network measurement request on two or more different packet data streams in order to combine the different packet data streams into a single network measurement request response. Thus, the output of the processing performed by query processing module 508 may be the result of selecting data from two different streams, projecting data from two different streams, aggregating data from two different streams or correlating data from two different streams.

Query output module 510 receives packet data stream metrics from query processing module 508 and transmits the metrics to the requesting measurement client via network interface 502, according to embodiments. In an embodiment, the query output module formats the metrics before transmitting the metrics to the measurement client. For example, the metrics may be formatted as an extensible markup language (XML) document according to an XML schema that the measurement client is capable of parsing.

3.4 Example Query—Elephant Flow

In an embodiment, an SQL-like declarative language may be used to define a network measurement request. For example, a network administrator may wish to identify elephant flows within a network. In a scenario where the network administrator does not know the elephant flow in advance, approaches disclosed herein may monitor all the flows in a particular time window (5 minutes for example) and select the flows whose throughput is larger than 1000 Mbit/sec. Where 1000 Mbit/sec defines an elephant flow. The process of identifying an elephant flow may be performed in four steps: 1) only monitor the packets from a particular source address (source A); 2) aggregate the flows based on their source and destination together (look at each flow as a bucket); 3) for each flow, count their TCP throughput; and 4) select the flows whose TCP-throughput is larger than 1000 Mbit/sec.

The approaches disclosed herein to identify elephant flows do not merely configure the network to just compute the elephant flows. Instead, the approaches disclosed herein may provide a mechanism for configuring network devices to both collect the packet field data required to identify the elephant flow and performing the operations required to identify the elephant flow.

The example network measurement request below is a SQL-like query that may be used to collect metrics from packet data and perform operations to identify an elephant flow. The SQL-like query may be used to dynamically configure network devices to find all of the hosts which had an elephant TCP conversation with host A in last 5 minutes. This process may include-measuring TCP throughput, for example. However, the query could include other logics; for example, aggregate all of the packets which have the same source address (srcAddr) and destination address (dstAddr), compute each groups TCP throughput, then select the groups that meet or exceed the elephant TCP throughput of 1000 Mbit/sec. An example SQL-like query may look similar to the following SQL-like statement.

```
SELECT dstAddr
FROM TCP_stream
WHERE srcAddr=A      //only interested in packets from source address A
GROUP BY (srcAddr, dstAddr) //aggregate packets having same source and destination addresses
    HAVING count(*)*AVG(tcp_win_size)>1000 //compute the tcp throughput and select the elephant one
    WINDOW 5 minutes //specify the computation window
    START NOW
    DURATION 1 hour
```

For example, the query above selects the destination address packet field from all packets from stream TCP_stream where the source address is equal to A. The query groups the packet data by source address and destination address and computes the TCP throughput to determine if the packets exceed the 1000 Mbit/sec throughput threshold for an elephant flow. The query also defines a computational window of 5 minutes, specifies that the query computations should start now and that the query should run for a duration of 1 hour. This is just one example of how a network administrator may identify an elephant flow using the approaches disclosed herein. Other parameters and operations may be defined or specified using the SQL-like declarative language approach for defining network metric collection activities.

The approaches disclosed herein are not limited to identifying elephant packet flows. For example, the approaches disclosed herein may be used to: count the number of new connections opened over 10 sec window for a specific server and indentify talk talkers to that server; list IP's accessing the server more than 10 times a second (or opening more than 10 connections per second); and measure latency of server (e.g. database) request response times (performed in the same port, the one connected to the server, needs to correlate request response).

The approaches disclosed herein may also be used to: perform "per service" aggregated measurements (how much traffic is destined to that specific virtual address that represents a service A) and how is it distributed over multiple servers (a virtual address corresponds to a range of addresses—compute distribution over those addresses—assume case of multiple load-balancers in front of the servers so that the measurement cannot be solved with a single point solution); determine which path is traffic taking between end points (each switch port knows its identity and can generate a timestamp); identify a misbehaving application (average TCPwindow size>usual average TCP window size) with usual average TCP window size=avg(windowSize) for that application (srcPort,dstPort) over multiple measurement points (=multiple distributed nodes); separate network (hop-by-hop)/server/application components of the delay perceived by an application (need to correlate request/response at each distributed node or planner needs to split it into 2 queries and correlate at the SB level).

The approaches described herein may also be used to compute compact per bucket (packets are mapped to a bucket through a simple hash function) hop-by-hop loss and delay statistics.

Embodiments disclosed herein may provide a mechanism for flexible network measurements without having to pre-define all of the desired metrics. Embodiments disclosed herein describe a flexible, dynamically configurable parser for collecting or generating metrics based on packet data. Thus, according to embodiments, instead of waiting for hardware or software upgrades from vendors when new metrics are desired, a network administrator can generate new metrics by merely creating a query statement defining the desired metrics using an SQL-like declarative language and submit the query to the flexible network measurement system disclosed herein. The approaches disclosed herein may provide a single measurement request mechanism for defining both packet data to collect and operations to perform on the packet data. The approaches disclosed herein may provide a single mechanism for defining packet parser configuration data and stream query operations. Moreover, the approaches disclosed herein may provide a single request mechanism for both generating packet data streams and performing packet data stream queries.

4.0 Implementation Mechanisms—Hardware Overview

Figure 6:
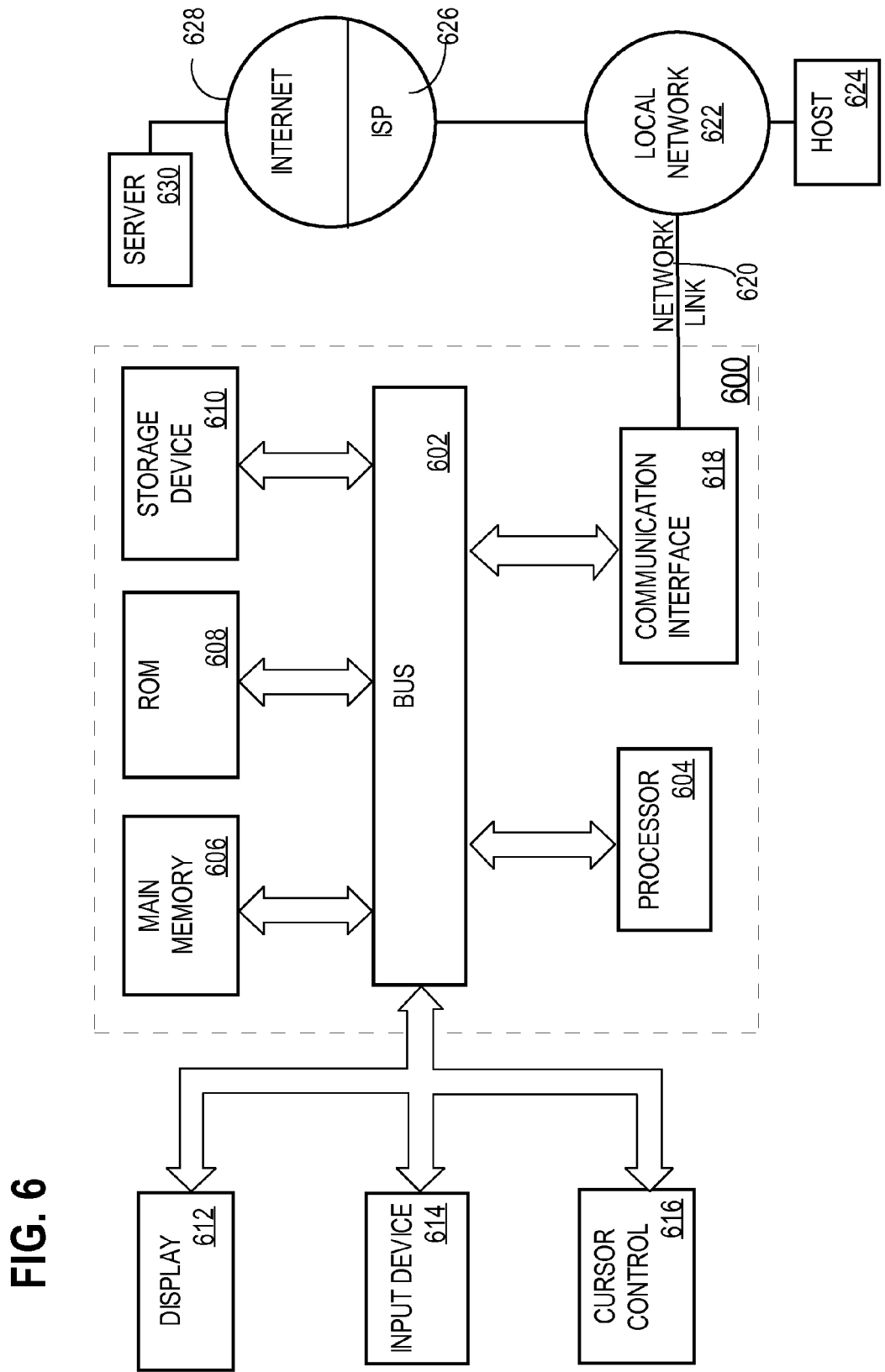
FIG. 6 illustrates a computer system upon which an embodiment may be implemented.

FIG. 6 is a block diagram that illustrates a computer system 600 upon which an embodiment may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Embodiments disclosed herein are related to the use of computer system 600 for implementing the techniques described herein. According to one embodiment, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions. Thus, embodiments are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer-system 600 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    a computer receiving a network measurement request defining a plurality of requested metrics to be collected based on network packet traffic;
    transmitting from the computer a first portion of the network measurement request to one or more network devices, wherein based on the first portion of the network measurement request the one or more network devices are configured to collect a plurality of first metrics based on packets received at the network devices and to generate one or more packet data streams that contain the collected first metrics;
    transmitting from the computer a second portion of the same network measurement request to a stream processing engine, wherein based on the second portion of the network measurement request the stream processing engine is configured to collect a plurality of second metrics by aggregating the collected first metrics from the one or more packet data streams;
    wherein the first portion and the second portion of the network measurement request are different portions;
    wherein the second portion and not the first portion comprises a measurement query configured to aggregate the collected first metrics;
    the computer receiving from the stream processing engine the plurality of second metrics, the plurality of second metrics corresponding to the plurality of requested metrics.

2. The method of claim 1, wherein the network measurement request is a relational algebra expression.

3. The method of claim 1, further comprising causing a network packet parser to be dynamically configured to collect network data from packets based on the first portion of the network measurement request.

4. The method of claim 1, further comprising causing the one or more network devices to be dynamically configured to perform one or more operations in response to receiving a network packet based on the first portion of the network measurement request, wherein the one or more operations include incrementing a counter, averaging packet field values, comparing packet field values, summing packet field values, grouping packet data, hashing packet data, or a combination thereof.

5. The method of claim 1, wherein the network measurement request is a streaming structured query language statement, an extensible markup language document, or language-integrated query statement.

6. The method of claim 1, further comprising selecting the one or more network devices from a plurality of network devices based on a proximity of the one or more network devices to a target network device identified in the first portion of the network measurement request.

7. The method of claim 1, wherein the second portion of the network measurement request defines one or more operations to be performed on the one or more packet data streams, wherein the one or more operations include a filtering operation, projection operation, a join operation, or a combination thereof.

8. A method comprising:
    a computer receiving a second portion of a network measurement request defining a plurality of second metrics be generated based on network packet traffic;
    receiving at the computer one or more packet data streams containing a plurality of first metrics, and generated by one or more network devices based on a plurality of packets received at the one or more network devices and upon receiving, by the one or more network devices, a first portion of the same network measurement request;
    wherein the first portion and the second portion of the network measurement request are different portions;
    the computer generating the plurality of second metrics, based on the second portion of the network measurement request and the plurality of first metrics included in the one or more packet data streams, the plurality of second metrics corresponding to a plurality of requested metrics defined by the second portion of the network measurement request;
    wherein the second portion not the first portion comprises a measurement query used to aggregate the collected first metrics;
    the computer transmitting the plurality of second metrics to a first device as a response to the second portion of the network measurement request.

9. The method of claim 8, wherein the network measurement request comprises a stream query and the second portion of the network measurement request comprises a first sub-query derived from the stream query that causes the computer to perform one or more operations on data included in at least two of the one or more packet data streams, wherein the one or more operations include a filtering operation, projection operation, a join operation, or a combination thereof.

10. The method of claim 9, wherein the first portion of the network measurement request comprises a second sub-query, derived from the stream query that defines packet stream data to be generated based on the plurality of packets received at the one or more network devices.

11. A method comprising:
a network device receiving from a first device a first portion of a network measurement request defining a plurality of requested metrics to be generated based on network packet traffic;
receiving a plurality of network packets at the network device;
the network device generating a plurality of first metrics based on one or more of the plurality of packets and the first portion of the network measurement request;
the network device transmitting the plurality of first metrics, to a stream processing engine, in one or more packet data streams, wherein the stream processing engine is configured to:
generate a plurality of second metrics based on a second portion of the same network measurement request and the one or more packet data streams, and to transmit the plurality of second metrics to the first device;
wherein the first portion and the second portion of the network measurement request are different portions;
wherein the second portion not the first portion comprises a measurement query used to aggregate the collected first metrics.

12. The method of claim 11, wherein the network measurement request comprises a stream query and the first portion comprises a sub-query derived from the stream query;
and the method further comprises:
upon receiving each of the plurality of network packets, performing one or more operations defined by the sub-query on each network packet to generate at least one of the one or more packet data streams.

13. A non-transitory computer-readable storage medium storing one or more sequences of instructions which, when executed by one or more processors, cause the processors to perform:
receiving a network measurement request defining a plurality of requested metrics to be collected based on network packet traffic;
transmitting a first portion of the network measurement request to one or more network devices, wherein based on the first portion of the network measurement request the one or more network devices are configured to collect a plurality of first metrics based on packets received at the network devices and to generate one or more packet data streams that contain the collected first metrics;
transmitting a second portion of the same network measurement request to a stream processing engine, wherein based on the second portion of the network measurement request the stream processing engine is configured to collect a plurality of second metrics from the one or more packet data streams;
wherein the first portion and the second portion of the network measurement request are different portions;
wherein the second portion not the first portion comprises a measurement query used to aggregate the collected first metrics;
receiving from the stream processing engine the plurality of second metrics, the plurality of second metrics corresponding to the plurality of requested metrics.

14. The non-transitory computer-readable storage medium of claim 13, wherein the network measurement request is a relational algebra expression.

15. The non-transitory computer-readable storage medium of claim 13, further comprising instructions causing a network packet parser to be dynamically configured to collect network data from packets based on the first portion of the network measurement request.

16. The non-transitory computer-readable storage medium of claim 13, further comprising instructions causing the one or more network devices to be dynamically configured to perform one or more operations in response to receiving a network packet based on the first portion of the network measurement request, wherein the one or more operations include incrementing a counter, averaging packet field values, comparing packet field values, summing packet field values, grouping packet data, hashing packet data, or a combination thereof.

17. The non-transitory computer-readable storage medium of claim 13, wherein the network measurement request is a streaming structured query language statement, an extensible markup language document, or language-integrated query statement.

18. The non-transitory computer-readable storage medium of claim 13, further comprising instructions causing selecting the one or more network devices from a plurality of network devices based on a proximity of the one or more network devices to a target network device identified in the first portion of the network measurement request.

19. The non-transitory computer-readable storage medium of claim 13, wherein the second portion of the network measurement request defines one or more operations to be performed on the one or more packet data streams, wherein the one or more operations include a filtering operation, projection operation, a join operation, or combination thereof.

20. A non-transitory computer-readable storage medium storing one or more sequences of instructions which, when executed by one or more processors, cause the processors to perform:
receiving a second portion of a network measurement request defining a plurality of second metrics to be generated based on network packet traffic;
receiving one or more packet data streams containing a plurality of first metrics, and generated by one or more network devices based on a plurality of packets received at the one or more network devices and upon receiving, by the one or more network devices, a first portion of the same network measurement request;
wherein the first portion and the second portion of the network measurement request are different portions;
generating the plurality of second metrics, based on the second portion of the network measurement request and the plurality of first metrics included in the one or more packet data streams, the plurality of second metrics corresponding to a plurality of requested metrics defined by the second portion of the network measurement request;
transmitting the plurality of second metrics to a first device as a response to the second portion of the network measurement request;
wherein the second portion not the first portion comprises a measurement query used to aggregate the collected first metrics.

21. The non-transitory computer-readable storage medium of claim 20, wherein the network measurement request comprises a stream query and the second portion of the network measurement request comprises a first sub-query derived from the stream query that causes the computer to perform one or more operations on data from at least two of the one or more packet data streams, wherein the one or more operations include a filtering operation, projection operation, a join operation, or a combination thereof.

22. The non-transitory computer-readable storage medium of claim 21, wherein the first portion of the network measurement request comprises a second sub-query derived from the stream query that defines packet stream data to be generated based on the plurality of packets received at the one or more network devices.

23. A non-transitory computer-readable storage medium storing one or more sequences of instructions which, when executed by one or more processors, cause the processors to perform:
- receiving from a first device a first portion of a network measurement request defining a plurality of requested metrics to be generated based on network packet traffic;
- receiving a plurality of network packets;
- generating a plurality of first metrics based on one or more of the plurality of packets and the first portion of the network measurement request;
- transmitting the plurality of first metrics, to a stream processing engine, in one or more packet data streams, wherein the stream processing engine is configured to:
  - generate a plurality of second metrics based on a second portion of the network measurement request and the one or more packet data streams, and to transmit the plurality of second metrics to the first device;
- wherein the first portion and the second portion of the network measurement request are different portions;
- wherein the second portion not the first portion comprises a measurement query used to aggregate the collected first metrics.

24. The non-transitory computer-readable storage medium of claim 23, wherein the network measurement request comprises a stream query and the first portion comprises a sub-query derived from the stream query;
- and wherein the storage medium further comprises instructions which, when executed, cause:
  - upon receiving each of the plurality of network packets, performing one or more operations specified by a sub-query on each network packet to generate at least one of the one or more packet data streams.

* * * * *